Feb. 25, 1969     H. P. BEHLEN ET AL     3,429,053
GRAIN DRYER WITH CONTROLLED GRAIN PASSAGEWAYS
Filed April 20, 1967                         Sheet 1 of 2
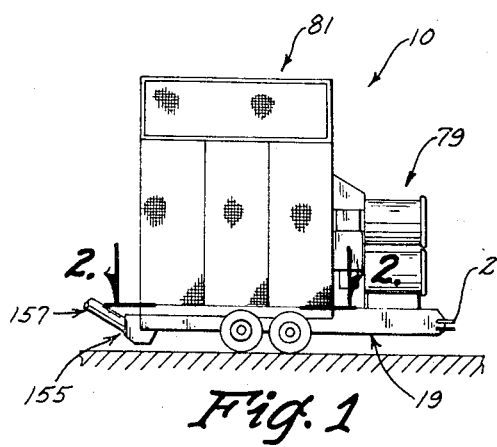
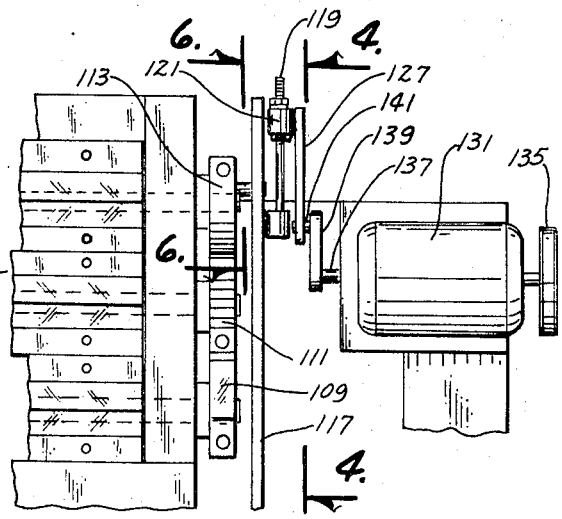
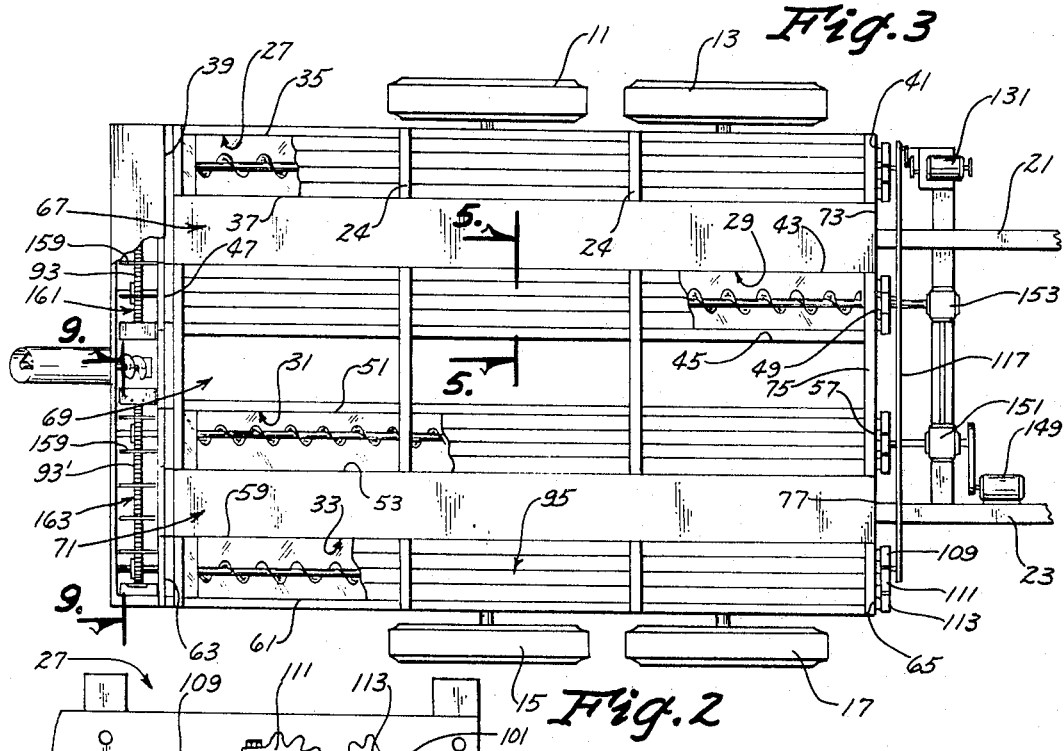
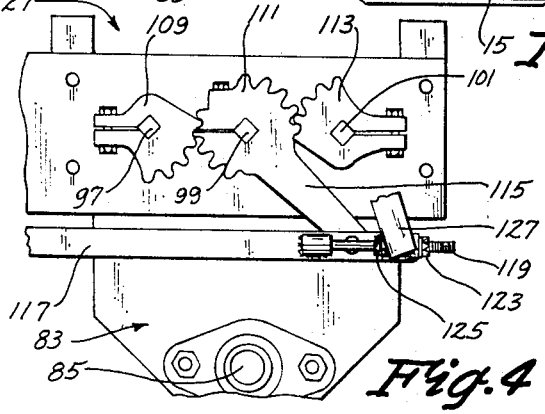
INVENTORS
HERBERT P. BEHLEN
DALE L. PLUGGE
BY
Zarley, McKee & Thomte
ATTORNEYS

INVENTORS
HERBERT P. BEHLEN
DALE L. PLUGGE

ATTORNEYS

United States Patent Office 3,429,053
Patented Feb. 25, 1969

3,429,053
GRAIN DRYER WITH CONTROLLED
GRAIN PASSAGEWAYS
Herbert P. Behlen and Dale L. Plugge, Columbus, Nebr., assignors to Behlen Manufacturing Company, Inc., Columbus, Nebr., a corporation of Nebraska
Filed Apr. 20, 1967, Ser. No. 632,436
U.S. Cl. 34—56                    10 Claims
Int. Cl. F26b *19/00*

ABSTRACT OF THE DISCLOSURE

A grain dryer comprising a plurality of horizontally disposed grain passageways having upper and lower ends, blower means adapted to force air of a predetermined temperature through the grain in the passageways and a valve means at the lower end of the passageways which are movable between open and closed positions, each of the valve means being comprised of a plurality of butterfly valves.

---

Conventional grain dryers are not satisfactory in that a sufficient amount of grain is not subjected to the drying air to permit a rapid rate of drying. Additionally, the conventional grain dryers are not designed to permit a uniform grain flow therethrough and the grain is sometimes mixed during the drying cycle which prevents uniform conditioning throughout the drying cycle.

Thus, it is a principal object of this invention to provide a grain dryer.

A further object of this invention is to provide a grain dryer which is designed to expose a maximum amount of grain to the drying air.

A further object of this invention is to provide a grain dryer wherein the flow of grain therethrough is continuous.

A further object of this invention is to provide a grain dryer which is designed to permit a uniform grain flow therethrough.

A further object of this invention is to provide a grain dryer wherein the grain is metered evenly from the bottom of a plurality of vertical columns to avoid mixing and to insure uniform conditioning throughout the drying cycle.

A further object of this invention is to provide a grain dryer which is completely automatic.

A further object of this invention is to provide a grain dryer having a plurality of butterfly valves mounted at the bottom of a plurality of grain passageways, the butterfly valves being actuated by a time-clock means or humidistat which automatically open the valves when the grain has reached a desired moisture level thereby causing a measured amount of grain to be dropped into an auger cavity.

A further object of this invention is to provide a grain dryer which eliminates the mixing of the grain in the grain column.

A further object of this invention is to provide a grain dryer which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a side view of the device;

FIG. 2 is an enlarged sectional view of the device as seen on line 2—2 of FIG. 1 with portions thereof cut away to more fully illustrate the invention;

FIG. 3 is a fragmentary top view of the butterfly valves, the power means and the means interconnecting the same;

FIG. 4 is a sectional view as would be seen on line 4—4 of FIG. 3;

Figure 5:
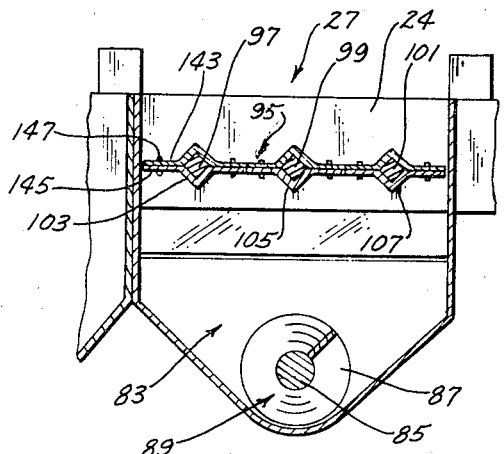
FIG. 5 is an enlarged sectional view as would be seen on line 5—5 of FIG. 2.

The grain dryer of this invention is indicated generally by the reference numeral 10. Dryer 10 is portable and has a pair of wheels 11, 13 and a pair of wheels 15, 17 rotatably mounted at opposite sides of a frame means 19 including a pair of longitudinal frame members 21 and 23 which are interconnected by a plurality of cross frame members 24 extending therebetween. The forward ends of frame members 21 and 23 are curved inwardly with respect to each other and are operatively secured together to form a hitch portion 25 at the forward end of the dryer to facilitate the transporting of the same.

Dryer 10 is provided with four grain columns or passageways 27, 29, 31 and 33 which are spaced apart and which extend upwardly from cross members 24. Grain passageway 27 is defined by vertical side walls 35 and 37 and end walls 39 and 41. Grain passageway 29 is defined by vertical side walls 43 and 45 and end walls 47 and 49. Grain passageway 31 is defined by vertical side walls 51 and 53 and end walls 55 and 57. Grain passageway 33 is defined by vertical side walls 59 and 61 and end walls 63 and 65. Side walls 37 and 43 define an air passageway 67 therebetween while side walls 45 and 51 define an air passageway 69 therebetween. Side walls 53 and 59 define an air passageway 71 therebetween. Air passageways 67, 69 and 71 are closed at their forward end by wall members 73, 75 and 77, respectively. Air passageways 67, 69 and 71 are in communication with heating means 79 which is adapted to force the drying air into the air passageways 67, 69 and 71. Walls 35, 37, 43, 45, 51, 53, 59 and 61 are perforated to permit the passage of air therethrough. A hopper means 81 is mounted at the upper end of the grain dryer 10 and is designed to channel grain deposited therein into the upper end of each of the grain passageways 27, 29, 31 and 33.

Grain passageway 27 is provided with a shroud 83 which encloses the lower end of the air passageway and which extends downwardly therefrom as best illustrated in FIG. 5. Shroud 83 is provided with opposite end walls having the opposite ends of an auger shaft 85 rotatably mounted in a bearing means thereon. Auger shaft 85 is provided with conventional auger flighting 87 thereon to form an auger means 89 which is rotatably mounted in shroud 83. The rearward end of auger shaft 85 rotatably extends through the end wall of shroud 83 and has a sprocket rigidly mounted thereon which is adapted to receive a chain 93 extending therearound. A valve means 95 is operatively mounted in shroud 83 and is comprised of shafts 97, 99 and 101 rotatably mounted in and extending through the cross frame members 24 for the length of the grain passageway 33. Shafts 97, 99 and 101 are provided with butterfly valve members 103, 105 and 107 secured thereto respectively. The forward ends of shafts 97, 99 and 101 extend outwardly through the forwardmost cross frame member 24 and have gear segments 109, 111 and 113 detachably secured thereto. Inasmuch as each of the valve means and associated structure are identical, only the valve means and associated structure in passageway 27 will be described with the suffixes "'," "''," "'''" indicating identical structure within passageways 29, 31 and 33 respectively. As seen in FIG. 4, gear segment 111 is adapted to mesh with gear segments 109 and 113 and has an arm member 115 which is pivotally secured to a rod 117 which extends across the front of the grain passageways 27, 29, 31 and 33 as best seen in FIG. 2. A bolt member 119 is secured to the end of rod 117 and has a collar 121 mounted thereon. Collar 121 may be longitudinally adjusted with respect to bolt member 119 by means of nuts 123 and 125 at opposite sides thereof. An arm member 127 is welded to collar 121 and extends diagonally upwardly therefrom and is provided with an elongated slot 129 adjacent its other end.

Figure 6:
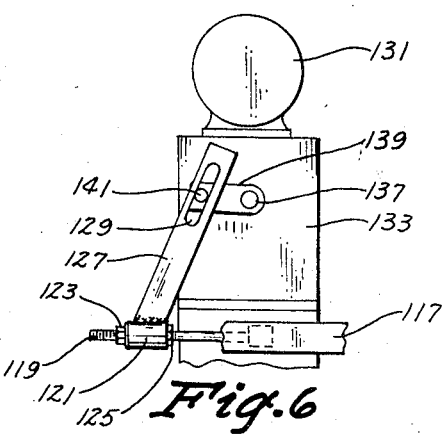
FIG. 6 is a sectional view as would be seen on line 6—6 of FIG. 3.

The numeral 131 designates an electric motor which is operatively connected to a gear box 133 by means of a belt 135. Gear box 133 is provided with a power shaft 137 rotatably extending from one end thereof (FIG. 6) having an eccentric 139 rigidly secured thereto. Eccentric 139 has a pin member 141 secured thereto adjacent its outer end which extends therefrom and is received by slot 129 in arm member 127. As seen in FIG. 5, valve member 103 is comprised of plates 143 and 145 which embrace shaft 97 and which are secured together by means of rivets 147 extending therethrough. Valve members 105 and 107 are identical in construction to valve member 103 and for that reason will not be described in detail. It can be seen in FIG. 5 that the valve members 103, 105 and 107 effectively close the grain passageway 29 when shafts 97, 99 and 101 are rotated to the proper predetermined position. It can be appreciated from FIG. 5 that the rotation of shafts 97, 99 and 101 from the position seen therein to a second position will cause the lower end of passageway 29 to be opened to the interior of shroud 83. The rotation of shafts 97, 99 and 101 is caused by the activation of motor 131 which in turn causes eccentric 139 and arm member 127 to move rod 117 thereby causing gear segment 11 to be rotated thereby causing gear segments 109 and 113 to be also rotated which causes the rotation of shafts 97, 99 and 101.

Figure 7:
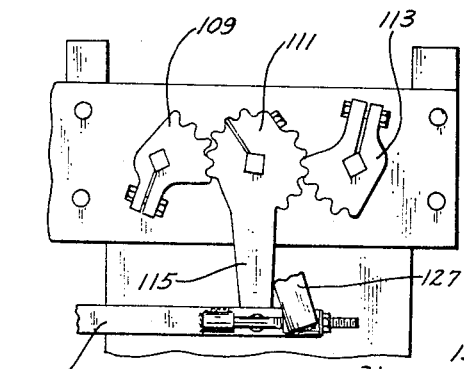
FIG. 7 is a sectional view as would be seen on line 4—4 of FIG. 3 and is similar to FIG. 4 except that the butterfly valves are in an open position.

It should be noted that a valve means is positioned below each of the grain passageways and that a shroud means and auger means is positioned beneath each of the valve means in a manner identical to that just described. Inasmuch as the valve means, shroud and auger means beneath each of the grain passageways are identical to that illustrated in FIGS 4, 5 and 7, this structure will not be described in detail.

Figure 9:
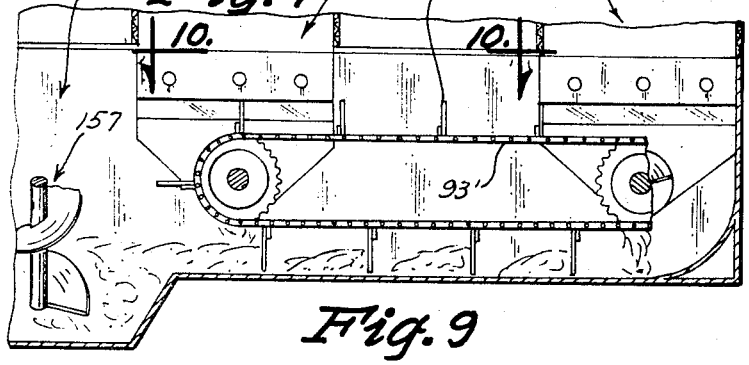
FIG. 9 is an enlarged sectional view as would be seen on line 9—9 of FIG. 2.

The auger means 89 together with the auger means in each of the shrouds is driven by an electric motor 149 which is operatively connected to gear boxes 151 and 153 which are each operatively connected to a pair of auger shafts as partially illustrated in FIGS. 2 and 9. Thus, the activation of motor 149 will cause the auger means in each of the shrouds to be operated to convey the grain therein to the rearward end of the dryer to a hopper means 155 having a discharge auger means 157 extending upwardly and rearwardly therefrom as illustrated in FIGS. 1, 2 and 9. As seen in FIG. 9, the chain 93 which interconnects the sprockets on the auger shafts positioned below grain passageways 31 and 33 has a plurality of grain cups 159 secured thereto which are adapted to move the grain which is ejected from the open rearward end of the shrouds to auger means 157. For purposes of description, the conveyer means formed by chain 93 and cups 159 will be indicated by the reference numeral 161 while the conveyor means formed by chain 93' and cups 159' will be indicated by the reference numeral 163.

Figure 11:
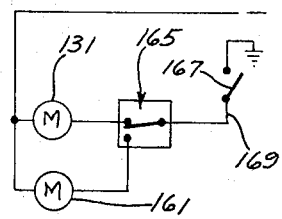
FIG. 11 is a schematic of the electrical circuity of this invention.
Figure 10:
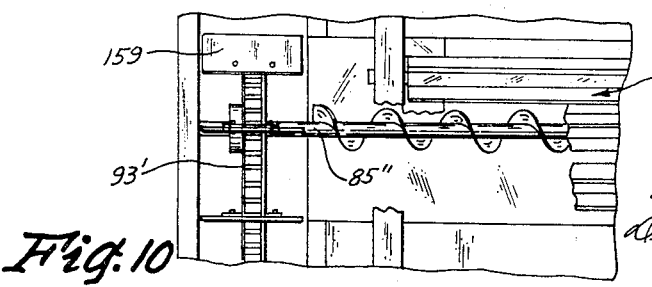
FIG. 10 is an enlarged sectional view as would be seen on line 10—10 of FIG. 9.

With respect to FIG. 11, the numeral 165 generally designates a conventional timer or humidistat which is connected to a master switch 167 by a lead 169. Element 165 is operatively electrically connected to valve motor 131 and is also operatively electrically connected to auger motor 161. Element 165 is of conventional design and is adapted to selectively actuate motor 131 and motor 161. For example, element 165 is adapted to actuate motor 131 for a predetermined period of time while at the same time preventing the activation of motor 161. In the dryer of this invention, it has been found that valve motor 131 must be activated for a period of approximately seven seconds during which time auger motor 161 should not be energized. As soon as element 165 de-energizes motor 131, element 165 is adapted to energize auger motor 161 to cause motor 161 to activate the various augers in the shrouds to convey the grain to auger means 157. It usually takes approximately two to three minutes to empty the grain from the shrouds and hopper means 155 and motor 161 will normally be de-energized and after the prescribed period of time has elapsed. Element 165 would again actuate valve motor 131 at the prescribed time whether element 165 is sensing time or grain humidity. Master switch 167 is merely imposed in the circuitry to de-energize the equipment as desired.

Figure 8:
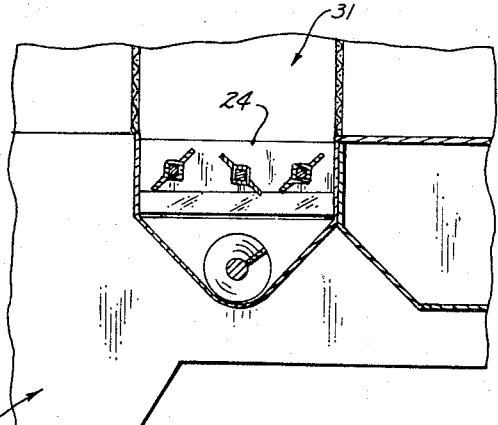
FIG. 8 is a sectional view taken through one of the grain columns to illustrate the relationship of the grain column, butterfly valves, grain auger and the collecting hopper therebelow.

The normal method of operation is as follows. The grain to be dried would be deposited in hopper means 81 by any suitable means and the filling of hopper means 81 would also cause grain passageways 27, 29, 31 and 33 to be likewise filled. The butterfly valves at the lower end of each of the grain passageways would normally be in a closed position as illustrated in FIGS. 2, 4 and 5 to prevent the grain being dumped from the lower end of the grain passageway. The heater means 79 would be operatively connected to its power supply and would be activated to cause dried air to be forced through the grain in the grain passageways 27, 29, 31 and 33. The butterfly valve means at the lower end of each of the grain passageways such as valve means 95 would be opened at a predetermined time by motor 131 if a timer is used for element 165 or the motor 131 would be energized when the grain in the lower end of each of the grain passageways has reached a desirable moisture content if a humidistat or the like is used for element 165. In any event, the activation of motor 131 will cause the valve members in each of the valve means at the lower ends of each of the grain passageways to be rotated from the position of FIG. 5 to the position of FIGS. 7 and 8 or in an open position. The opening of the valve members causes the grain in the lower end of the grain passageways to pass from the passageway into the shroud beneath the valve means. When a predetermined amount of grain has passed from each of the grain passageways, motor 131 would have moved rod 117 back to a position whereby the valve members would again be closed. As previously stated, the opening and closing of the valve members usually takes approximately seven seconds but this time can obviously be adjusted by means of adjusting collar 121 with respect to bolt member 119 which will obviously change the throw of arm member 127. Additionally, the motor 131 and the gear box 133 can also be designed to vary the length of time needed to open and close the valve means. It should be noted that the auger means beneath each of the valve means is inoperative during the time that the valve means thereabove is opened to prevent mixing of the grain within the grain passageway. As soon as the valve means has been moved to its closed position, motor 161 is energized for a sufficient period of time to cause the grain to be conveyed from the various shrouds to the hopper means 155 where the same can be discharged therefrom by means of auger means 157.

Thus it can be seen that a portable dryer has been described which permits more grain to be exposed to the drying air thereby providing faster drying. The grain passageways are straight from the top to bottom thereby permitting the maximum uniform grain flow therethrough.

The grain is metered evenly from the bottom of each grain passageway to avoid mixing and to insure uniform conditioning throughout the drying cycle. It can also be appreciated that the element 165 which may include a time clock or a moisture content sensing device causes the triggering of the butterfly valves at the bottom of each grain column. These valves automatically open when the grain has reached a desired moisture level and a measured amount of grain is dropped into the shroud immediately therebelow. The grain is not removed from the shroud until after the valves have closed thereby preventing mixing from taking place in the grain column. While the dryer has been described as being adapted to force hot air through the grain, it can also be appreciated that the device could be designed to force dry refrigerated air therethrough without departing from the scope of this invention.

Thus, it can be seen that the device accomplishes at least all of its stated objectives.

Some changes may be made in the construction and arrangement of our grain dryer without departing from the real spirit and purpose of our invention, and it is our intention to cover by our claims, any modified forms of structure or use of mechanical equivalents which may be reasonably included within their scope.

We claim:
1. In a grain dryer, comprising,
   at least one vertically disposed grain passageway having upper and lower ends,
   blower means adapted to force air of a predetermined temperature through the grain in said passageway,
   a valve means at the lower end of said passageway and movable between open and closed positions, said valve means permitting grain to pass downwardly from said passageway when in an open position and preventing grain from passing downwardly from said passageway when in a closed position,
   a power means adapted to open and close said valve means,
   and a conveyor means below said valve means adapted to convey the grain passing through said valve means.
2. The dryer of claim 1 wherein a control means is operatively connected to said power means and said conveyor means adapted to deactivate said conveyor means when said valve means is opened to prevent mixing of the grain within said passageway.
3. The dryer of claim 1 wherein said valve means is comprised of a plurality of butterfly valve members rotatably mounted about a horizontal axis.
4. The dryer of claim 1 wherein a plurality of grain passageways are horizontally spaced from each other and have an air passageway therebetween, said blower means being in communication with said air passageways, said grain passageways having perforated wall members to permit the air to pass from said air passageways and through said perforated wall members into said grain in said grain passageways, each of said grain passageways having a rectangular cross-section from its upper end to its lower end, one of said valve means being positioned directly below the lower end of each of said grain passageways.

5. The dryer of claim 3 wherein said butterfly valve members are each mounted on a shaft rotatably mounted about a horizontal axis, each of said shafts having a gear segment secured to one end thereof which are in mesh with each other and wherein one of said gear segments is operatively connected to said power means, said power means adapted to rotate said one gear segment thereby causing the rotation of the gear segments in mesh therewith.
6. The dryer of claim 1 wherein said valve means is comprised of first, second and third butterfly valve members rotatably mounted about a horizontal axis, said second valve member being positioned between said first and third valve members, said first, second and third valve members being mounted on first, second and third shafts respectively, said second shaft having a gear segment on one end thereof which is in mesh with a gear segment on one end of each of said first and third shafts whereby rotation of said second gear segment will cause the rotation of said first and third gear segments, said second gear segment being operatively connected to an eccentric arm means operatively connected to said power means.
7. The dryer of claim 6 wherein a plurality of grain passageways are spaced apart from each other and wherein a valve means is positioned below each of said grain passageways, said second shaft gear segment of each of said valve means being interconnected whereby said power means simultaneously operates each of the valve means.
8. The dryer of claim 7 wherein a rod interconnects each of said second shaft gear segments and wherein an arm member is adjustably secured to said rod, said arm member having a slot formed therein which is adapted to receive a pin means extending from an eccentric arm means operatively connected to said power means.
9. The dryer of claim 1 wherein said valve means is comprised of a plurality of butterfly valve members rotatably mounted about a horizontal axis, said butterfly valve members being operatively interconnected with each other, one of said valve members being connected to said power means, said power means adapted to rotate said one valve member thereby causing the rotation of the other valve members interconnected therewith.
10. The dryer of claim 1 wherein said valve means is comprised of a plurality of butterfly valve members positioned adjacent to each other and rotatably mounted about a horizontal axis, said grain passageway having a single discharge opening at its lower end, said valve members cooperating with each other to close said single discharge opening when in a closed position.

References Cited

UNITED STATES PATENTS

| | | | |
|---|---|---|---|
| 2,946,132 | 7/1960 | Armstrong | 34—167 X |
| 3,129,073 | 4/1964 | Mathews | 34—56 |

JOHN J. CAMBY, *Primary Examiner.*

U.S. Cl. X.R.

34—167